US010762644B1

(12) United States Patent
Mahadevan et al.

(10) Patent No.: US 10,762,644 B1
(45) Date of Patent: Sep. 1, 2020

(54) MULTIPLE OBJECT TRACKING IN VIDEO BY COMBINING NEURAL NETWORKS WITHIN A BAYESIAN FRAMEWORK

(71) Applicant: Amazon Technologies, Inc., Seattle, WA (US)

(72) Inventors: Vijay Mahadevan, San Francisco, CA (US); Stefano Soatto, Pasadena, CA (US)

(73) Assignee: Amazon Technologies, Inc., Seattle, WA (US)

( * ) Notice: Subject to any disclaimer, the term of this patent is extended or adjusted under 35 U.S.C. 154(b) by 75 days.

(21) Appl. No.: 16/218,973

(22) Filed: Dec. 13, 2018

(51) Int. Cl.
*G06K 9/00* (2006.01)
*G06T 7/246* (2017.01)
*G06N 3/04* (2006.01)
*G06N 3/08* (2006.01)
*G06F 17/18* (2006.01)
*G06T 11/20* (2006.01)

(52) U.S. Cl.
CPC ............. *G06T 7/251* (2017.01); *G06F 17/18* (2013.01); *G06N 3/0454* (2013.01); *G06N 3/0472* (2013.01); *G06N 3/084* (2013.01); *G06T 11/20* (2013.01); *G06T 2207/20081* (2013.01); *G06T 2207/20084* (2013.01); *G06T 2210/12* (2013.01)

(58) Field of Classification Search
CPC ..................................................... G06T 7/251
USPC ......................................................... 382/103
See application file for complete search history.

*Primary Examiner* — Stephen P Coleman
(74) *Attorney, Agent, or Firm* — Nicholson De Vos Webster & Elliott, LLP

(57) ABSTRACT

Techniques for multiple object tracking in video are described in which the outputs of neural networks are combined within a Bayesian framework. A motion model is applied to a probability distribution representing the estimated current state of a target object being tracked to predict the state of the target object in the next frame. A state of an object can include one or more features, such as the location of the object in the frame, a velocity and/or acceleration of the object across frames, a classification of the object, etc. The prediction of the state of the target object in the next frame is adjusted by a score based on the combined outputs of neural networks that process the next frame.

20 Claims, 10 Drawing Sheets

MULTIPLE OBJECT TRACKING IN VIDEO BY COMBINING NEURAL NETWORKS WITHIN A BAYESIAN FRAMEWORK

BACKGROUND

Many of the recent advances in computer vision are in the field of machine learning. For example, in the deep learning space, neural networks that can detect and classify objects have been developed that, in some cases, can outperform a human's ability to perform the same task. Advances in tracking objects in motion video using machine learning, however, have lagged behind applications of neural networks to still image problems such as detection and classification. One reason for that lag is the difficulty associated with object tracking dramatically complicates the use of neural networks that have been developed for still images in video applications. Generalized single-object trackers often rely on an input in the form of a bounding box of an object in a frame which is used to track the object in subsequent frames. Meanwhile, most multiple-object trackers specialize in tracking people and are tailored to that specific domain by relying on facial recognition, skeletal modeling, etc., and are thus unsuitable for use as a generalized multiple-object tracker. Further, most multiple-object trackers operate offline on recorded video of a predefined duration and determine tracking paths of the objects within the video using references to both future and past frames.

BRIEF DESCRIPTION OF DRAWINGS

Various embodiments in accordance with the present disclosure will be described with reference to the following drawings.

DETAILED DESCRIPTION

Various embodiments of methods, apparatus, systems, and non-transitory computer-readable storage media for multiple object tracking by combining neural networks within a Bayesian framework are described. According to some embodiments, a principled Bayesian filtering framework is used to combine two complementary signals when scoring a predicted state of an object: the likelihood that a candidate region in a frame of a video corresponds to an object of a particular category (termed category likelihood) and the likelihood that a candidate region in a frame corresponds to a particular instance of an object being tracked (termed instance likelihood). In some embodiments, the category likelihood is computed using an object detection neural network that detects objects in a given frame of the video with varying degrees of confidence and the instance likelihood is computed using a template matching neural network that searches the current frame for all objects tracked up to the previous frame.

By combining the category and instance likelihoods within a Bayesian framework, embodiments of a multiple object tracker are robust to noise and object motion between frames as the state of an object is probabilistic and does not collapse down to a single value. Further, because the Bayesian framework is causal (i.e., it evaluates the previous and current frames and does not depend on future or subsequent frames in the video), embodiments of a multiple object tracker can be used for online analysis of video, such as is the case for live video feeds, in addition to pre-recorded video. Additionally, by employing an object-based approach for instance likelihood, embodiments of a multiple object tracker do not depend on any category specific embedding, unlike many existing tracking implementations that may be tailored to tracking specific types of objects (e.g., people).

Figure 1:
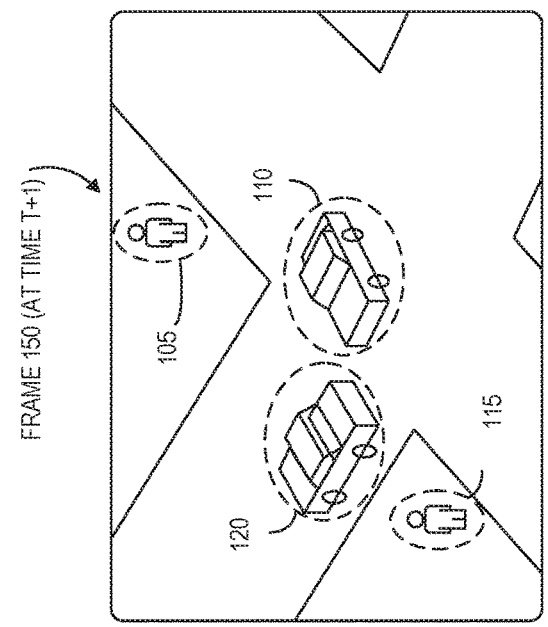
FIG. 1 is a diagram conceptually illustrating multiple object tracking in video based on state probability distributions according to some embodiments.
Figure 1:
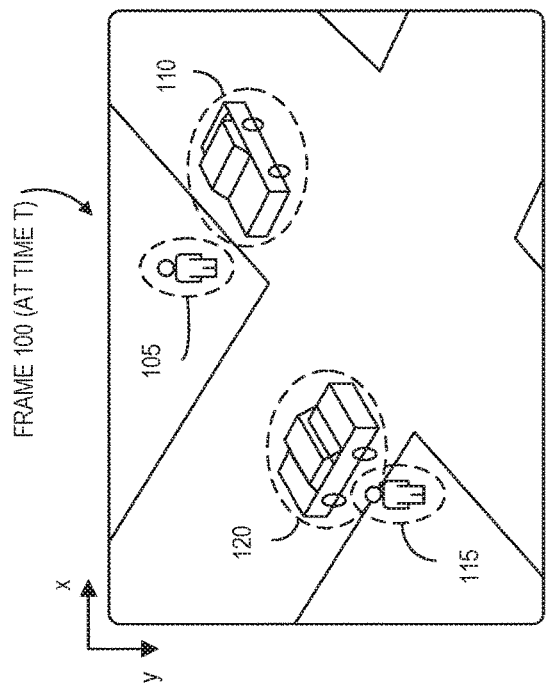
Figure 1:
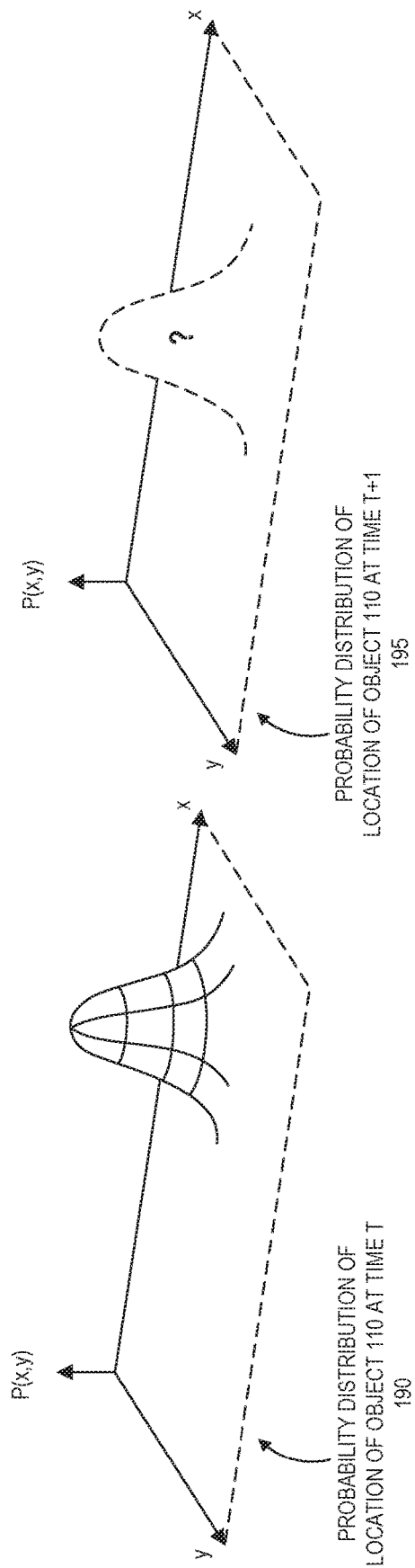

FIG. 1 is a diagram conceptually illustrating multiple object tracking in video based on state probability distributions according to some embodiments. A video frame, such as video frame 100 or video frame 150, includes an array of pixels each having an x and y coordinate. Visually, frame 100 shows four objects 105, 110, 115, 120 at a time T. Similarly, frame 150 shows the four objects 105, 110, 115, 120 at time T+1 where some of the objects have moved relative to frame 100. Multiple object trackers attempt to match the same objects across frames and track the location of the objects in the frames. Thus, a multiple object tracker attempts to match person object 105 between frames 100 and frame 150, vehicle object 120 between frame 100 and frame 150, etc.

To account for noise in the raw video data and errors introduced by computational analysis, the disclosed multiple object tracker operates at a probabilistic rather than absolute level. For example, the position of each of a given object in a frame can be numerically represented as a probability distribution of that object's centroid. As illustrated, the probability distribution 190 of object 110 at time T illustrated the probability that object 110 is at a given x, y coordinate of the frame. Other probability distributions may be used for the other objects (not shown). Conceptually, embodiments of the disclosed Bayesian framework within which to combine neural networks are used to answer the question of what is the probability distribution 195 of object 110 at time T+1 based on the prior probability distribution 190 and the observation associated with the frame 150 at time T+1.

In the tracking context, each frame of a video may be considered an observation of the state of the objects within the frame. As denoted herein, a video, y, is composed of a series of frames such that $y=\{y_1, y_2, \ldots y_t\}$ where t is or is proportional to a time associated with the frame. For example, for a video captured at 30 frames-per-second, frames $y_1$ through $y_{30}$ would correspond to the first second of video, frames $y_{31}$ through $y_{60}$ would correspond to the second second of video, and so on.

Although the probability distributions 190, 195 in FIG. 1 are indicated as representing the location of an object, a probability distribution associated with the state of an object may be based on many other parameters besides location, including a category of the object (e.g., a person, a car, a dog, etc.), a bounding box for the object, a velocity for the object, an acceleration of an object, etc. In examples described herein, θ is a state representation of a given object i at a time t and is given by $\theta_t^i = \{c_t^i, \text{where } t^i, s_t^i\}$, is a category vector of the object, d is an entity identifier of the object, and s is a feature vector that may include one or more features associated with the object.

The category vector c corresponds to a particular type of objects the multiple object tracker is trained to track. For example, classification neural networks are trained to classify objects into some number of categories (e.g., person, car, dog, cat, truck, etc.) in a category vector which represents the likelihood that the detected object belongs to a particular category or classification. The likelihoods may be represented in relative or absolute terms. For example, if objects are classified into three categories—person, car, and dog—a classification neural network can generate a vector having three terms having positions in the vector corresponding to the likelihood associated with each category (e.g., a normalized vector may equal {0.82, 0.15, 0.03} where 82% represents the likelihood that the object is a person, 15% represents the likelihood that the object is dog, and 3% represents the likelihood that the object is a vehicle).

The entity identifier is a unique identifier assigned to each object in a video. For example, if the initialization stage of the multiple object tracker initially identifies five objects in the first frame in a video sequence, as described below, the five objects may be respectively assigned entity identifiers 1, 2, 3, 4, and 5. Further, as new objects enter the video in subsequent frames, as described below, they may continue to have new entity identifiers assigned (e.g., 6, 7, and so on).

The feature vector represents an arbitrary number of features that are associated with an object. In the examples provided herein, the feature vector includes pixel x and y coordinates of the objects estimated centroid, a pixel height and width of a bounding box of the object, and an x and y velocity associated with the object (e.g., in pixels per frame). Other embodiments may include different sets of features. For example, person objects may include features associated with a skeletal model (e.g., head position, hand positions, etc.) or facial features (e.g., for facial recognition).

Formalizing the above question regarding the probability distribution associated with the state of an object at the next time step, the Bayesian formulation is as follows:

$$P(\theta_{t+1}|y_{t+1}) = P(y_{t+1}|\theta_{t+1}) \int P(\theta_{t+1}|\theta_t) P(\theta_t|y_t).$$

In the above formulation, the term $P(\theta_{t+1}|y_{t+1})$ represents the probability of the existence of an object having state θ at time t+1. The integral term represents the application of a predictive model, $P(\theta_{t+1}|\theta_t)$, to the prior state probability, $P(\theta_t|y_t)$. The term $P(y_{t+1}|\theta_{t+1})$ represents the likelihood score, which, as detailed below, includes both the instance likelihood and the category likelihood. The likelihood score represents a model or function that outputs the posterior state probability by scaling or adjusting the output of the predictive model applied to the prior state probability. As a result, a posterior distribution representing the state of an object at time t+1 can be calculated from the prior distribution at time t (which is the posterior distribution at time t−1) by application of the likelihood model and the predictive model.

The likelihood score represents how likely it is that an object with state $\theta_t$ (or time t+1) will generate an object in the corresponding observation y at that time. Using Bayes' rule, the likelihood score can be approximated as follows:

$$P(y_t|\theta_t^i) = \frac{P(\theta_t^i|y_t)P(y_t)}{P(\theta_t^i)} \to P(y_t|\theta_t^i) \propto P(\theta_t^i|y_t).$$

This approximation can be made based on the observation that $P(y_t)$ can be treated as a constant for a given frame and $P(\theta_t^i)$, the prior distribution used in the model to generate a posterior distribution, approximates the shape of the posterior distribution. Since $P(y_t|\theta_t^i)$ is proportional to $P(\theta_t^i|y_t)$ and $P(\theta_t^i|y_t)$ the Bayesian formulation can be re-written as follows:

$$P(\theta_{t+1}|y_{t+1}) = P(\theta_{t+1}^i|y_{t+1}) \int P(\theta_{t+1}|\theta_t) P(\theta_t|y_t).$$

With P(θ|y) can be generally treated as an output of a neural network, the outputs of neural networks can be combined for use in a multiple object tracker, as described herein.

Expanding the likelihood score, $P(\theta_{t+1}^i|y_{t+1})$, for the exemplary state θ above produces three components, as follows:

$$P(\theta_{t+1}^i|y_{t+1}) = P(c_{t+1}^i, d_{t+1}^i, s_{t+1}^i|y_{t+1}) \text{ and}$$

$$P(c_{t+1}^i, d_{t+1}^i, s_{t+1}^i|y_{t+1}) = P(d_{t+1}^i|c_{t+1}^i, y_{t+1}) P(c_{t+1}^i|s_{t+1}^i|y_{t+1}).$$

In the expansion, $P(d_{t+1}^i|c_{t+1}^i, s_{t+1}^i, y_{t+1})$ represents the likelihood that an object of a specific instance d has a given classification c and feature set s in a frame y and is referred to as the instance likelihood score. $P(c_{t+1}^i|s_{t+1}^i, y_{t+1})$ represents the likelihood that an object of a specific category c has a given feature set s in a frame y and is referred to as the category likelihood score. $P(s_{t+1}^i|y_{t+1})$ represents the likelihood that an object of a feature set s is in a frame y.

Figure 2:
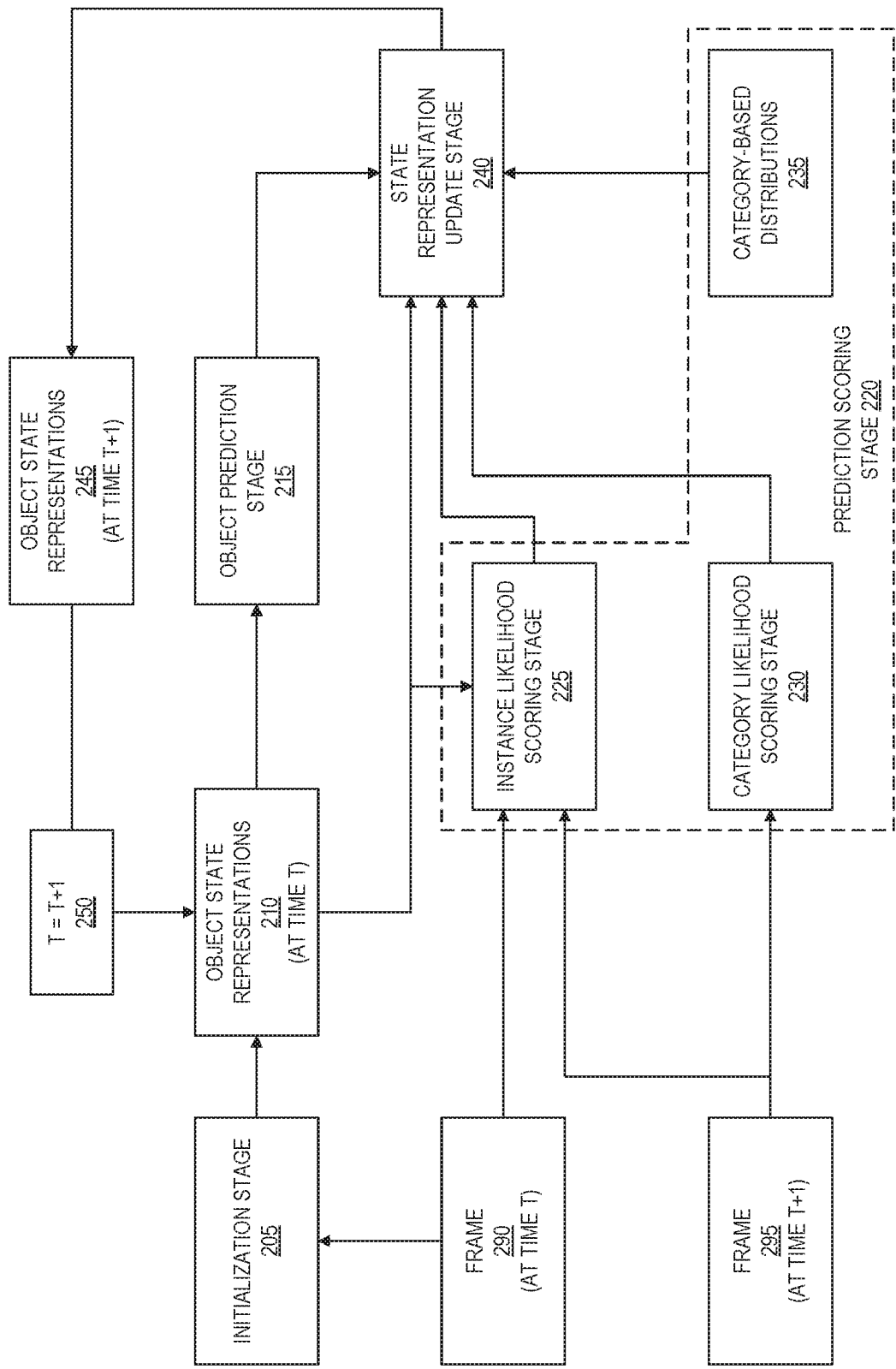
FIG. 2 is a diagram illustrating a multiple object tracker implemented by combining neural networks within a Bayesian framework according to some embodiments.

FIG. 2 is a diagram illustrating a multiple object tracker implemented by combining neural networks within a Bayesian framework according to some embodiments. As shown, the multiple object tracker includes an initialization stage 205, an object prediction stage 215, a prediction scoring stage 220, and a state representation update stage 240. Each of these components may be implemented as code (e.g., executable instructions, one or more computer programs, or one or more applications) executing on one or more processors, by hardware, or combinations thereof. The multiple object tracker operates on data including the frame 290 at time t, the frame 295 at time t+1, object state representations 210 at time t, object state representations 245 at time t+1, and category-based distributions 235. The data may be stored using any suitable memory technology, such as random-access memory (RAM), static RAM (SRAM), synchronous dynamic RAM (SDRAM), nonvolatile/Flash-type memory, or any other type of memory to provide the components of the multiple object tracker access to the data used during processing.

The initialization stage 205 initializes the object state representations θ based on the first or initial frame in a video sequence and is described in further detail below with reference to FIG. 3. The object prediction stage 215 applies a motion model $P(\theta_{t+1}|\theta_t)$ to the prior distribution $P(\theta_t|y_t)$ to generate a predicted distribution of the object state representation without reference to the next observation $y_{t+1}$. Note that this stage corresponds to the integral term in the above Bayesian formulation. Additional details regarding the object prediction stage 215 are provided below with reference to FIG. 4.

The prediction scoring stage 220 provides scores to weight the predictions generated by the object prediction stage 215. As shown, the prediction scoring stage 220 includes an instance likelihood scoring stage 225, a category likelihood scoring stage 230, and the category-based distributions 235. The instance likelihood scoring stage 225 generates the $P(d_{t+1}^i | c_{t+1}^i, s_{t+1}^i, y_{t+1})$ term in the likelihood score and is described in further detail below with reference to FIG. 5. The category likelihood scoring stage 230 generates the $P(c_{t+1}^i | s_{t+1}^i, y_{t+1})$ term in the likelihood score and is described in further detail below with reference to FIG. 6.

The category-based distributions 235 correspond to the $P(s_{t+1}^i | y_{t+1})$ term in the likelihood score. The category-based distributions 235 represent the likelihood that an object of a feature set s is in a frame y. These distributions may be stored in any suitable memory and based on domain-specific knowledge regarding the likelihood that an object of a given category is in some portion of the frame. For example, if a video sequence includes frames having a skybox, the distributions may reflect a lower likelihood that an object of a "person" category is in the skybox, while an object of a "plane" category is more likely to be in the skybox. In some embodiments, the category-based distributions 235 are treated as a uniform distribution for objects of all categories.

The state representation update stage 240 combines the predicted object states with the terms of the likelihood score (from the instance likelihood scoring stage 225, the category likelihood scoring stage 230, and the category-based distributions 235) to update the object state representations 210 (at time t) to the object state representations 245 (at time t+1). Note the object state representations 245 represent the state of objects prior to processing the next observation (or after processing the most recent observation). As indicated at block 250, after the next time step or observation, the object state representations 245 become the object state representations 210 for the next iteration. after processing the next observation. Additional details regarding the state representation update stage 240 are provided below with reference to FIG. 7.

Figure 3:
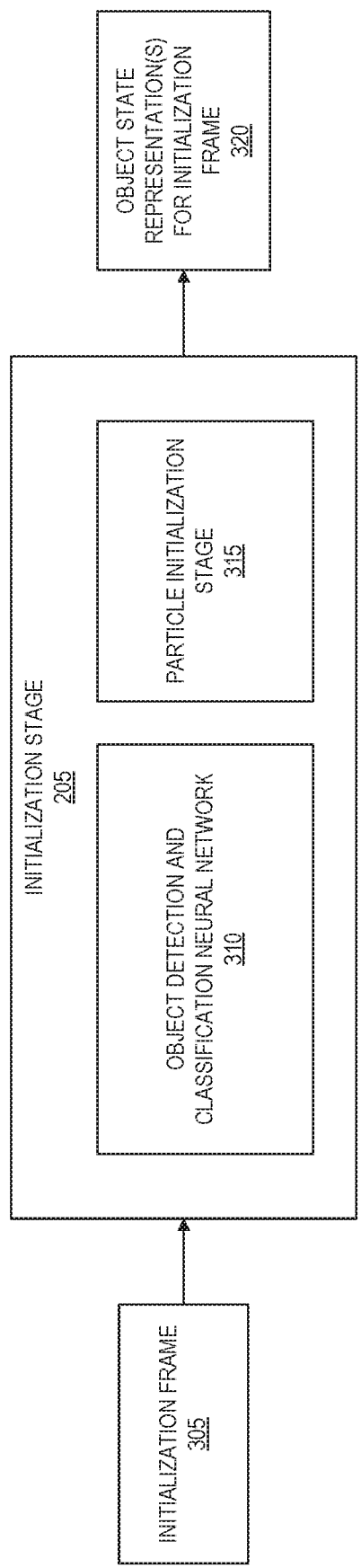
FIG. 3 is a diagram illustrating the initialization stage of the multiple object tracker of FIG. 2 according to some embodiments.

FIG. 3 is a diagram illustrating the initialization stage of the multiple object tracker of FIG. 2 according to some embodiments. In some embodiments, the implementation of the multiple object tracker uses a particle filter as an estimator to maintain a probability distribution over likely states of an object i without collapsing the state distribution into a single estimate. Each object is represented by a plurality of particles, and each particle represents a possible state (e.g., a hypothesis) regarding the actual state of the object. By avoiding collapsing the probability distribution of the state of an object into a single estimate, the multiple object tracker can track objects even when they are temporarily occluded in the video (e.g., a person passing behind a tree or a car passing under an overpass). Other embodiments may use other estimators to generate state hypotheses from a probability distribution representing the state of an object, such as Kalman filters, unscented Kalman filters, etc.

As shown, the initialization stage 205 includes an object detection and classification neural network 310 and a particle initialization stage 315. The object detection and classification neural network 310 may be one of many neural networks trained to identify and classify various types of objects in a frame, such as R-CNN, Faster R-CNN, Yolo CNN, Mask R-CNN, or SSD. The object detection and classification neural network 310 includes an input layer that takes as input an initialization frame 305 and outputs information identifying objects, each object having an associated set of features (e.g., location, bounding box, classification vector, etc.). In some embodiments, the object detection and classification neural network 310 outputs a detection score associated with each object that indicates the confidence of the detection. In some embodiments, the particle initialization stage 315 may only initialize state representations for objects that have a detection score above a threshold (e.g., for high-confidence detections).

For example, the object detection and classification neural network 310 may output an indication of two objects, A and B, having an associated centroid location (e.g., in pixel x and y coordinates), bounding box (e.g., in pixel width and height), and classification vector such as the one described above where each position in the vector corresponds to the likelihood that the object is a given classification (e.g., {person, dog, vehicle}). Based on this data, the particle initialization stage 315 may assign an entity identifier to each object such as assigning entity identifier '1' to object A and entity identifier '2' to object B.

In embodiments using a particle filter, the particle initialization stage 315 initializes a set of particles for each detected object, each particle representing a potential state of the object. An exemplary individual particle z may correspond to a portion of the state representation θ of an object and an associated weight, w, such that $z_k = \{s_t^{i,k}, w_k\}$ where $k = \{1, 2, \ldots M\}$ and each object is represented by M particles. For example, the particle initialization stage 315 may initialize 1,000 particles for each object and set each weight w to a default value (e.g., '1'). Taken together, each of the particles z for a given object represent the probability distribution associated with the object. In some embodiments, each particle may be assigned a classification based on the relative probabilities in the classification vector output from the object detection and classification neural network 310. For example, of 1,000 particles, 820 can be assigned be person objects, 150 can be assigned dog objects, and 30 can be assigned vehicle objects based on the exemplary classification vector above.

In some embodiments, the particle initialization stage 315 initializes at least a portion of the feature vector $s_t^{i,k}$ of a given particle may be based on the features output from the object detection and classification neural network 310 (e.g., centroid, bounding box). In some embodiments, the particle initialization stage 315 may inject the features from the object detection and classification neural network 310 with random or statistical noise. For example, if object A has a centroid at pixel x-coordinate 100 and y-coordinate 1000 with a bounding box of 30-pixels by 30-pixels, the particle initialization stage 315 may generate an adjustment to each particles' centroid and size based on a normal distribution having a mean centered at the respective parameter and a variance based on the magnitude of the parameter. Thus, one particle may have a centroid at pixel x-coordinate 90 and y-coordinate 1005 while another particle has a centroid at pixel x-coordinate 110 and y-coordinate 993.

In some embodiments, the particle initialization stage 315 initializes the movement features (e.g., velocity, acceleration) of a given particle with random values since the particle initialization stage 315 is operating on a single frame and does not observe object motion over time. In embodiments employing a constant-velocity motion model, the particle initialization stage 315 may randomly initialize the x and y velocities for each particle within some reasonable range (e.g., zero to less than half the width of a frame in a single tick). In some embodiments, the movement features may be category-based (e.g., a higher velocity for vehicles than persons).

Other embodiments may initialize the state representations of objects in other ways. In some embodiments a user may manually identify and classify each of the objects in the initialization frame 305. In some embodiments, an initialization stage may generate a set of particles of randomized classifications, sizes, and locations throughout a frame without reference to an initialization frame.

Figure 4:
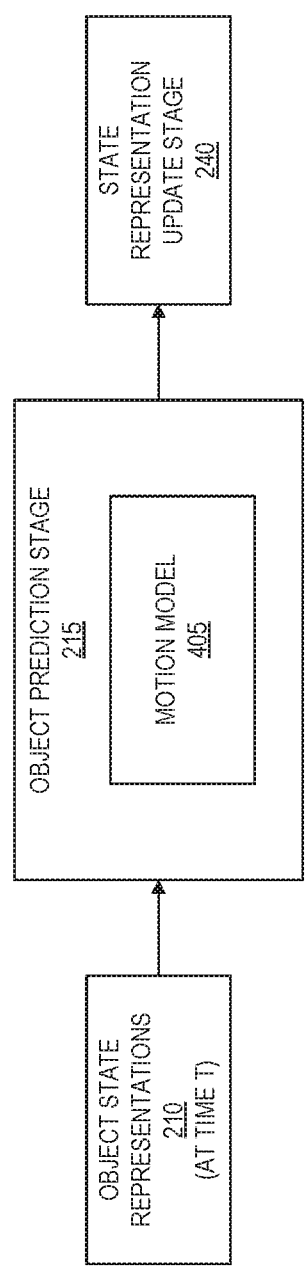
FIG. 4 is a diagram illustrating the object prediction stage of the multiple object tracker of FIG. 2 according to some embodiments.

FIG. 4 is a diagram illustrating the object prediction stage of the multiple object tracker of FIG. 2 according to some embodiments. As shown, the object prediction stage 215 includes a motion model 405 that attempts to predict the motion of objects at the next time step given their current state (e.g., $P(\theta_{t+1}|\theta_t)$). The object prediction stage 215 takes as input the position and movement (e.g., velocity, acceleration, etc.) features of the state representations of the objects and provides a predicted position of each object based on the motion model 405 to the state representation update stage 240. In embodiments employing a particle filter, each particle will have a predicted location after application of the motion model 405. In an exemplary embodiment, a uniform velocity motion model is used, such as the one shown below.

$$\begin{bmatrix} x_{t+1} \\ y_{t+1} \\ \dot{x} \\ \dot{y} \end{bmatrix} = \begin{bmatrix} 1 & 0 & \Delta t & 0 \\ 0 & 1 & 0 & \Delta t \\ 0 & 0 & 1 & 0 \\ 0 & 0 & 0 & 1 \end{bmatrix} \begin{bmatrix} x_t \\ y_t \\ \dot{x} \\ \dot{y} \end{bmatrix}$$

Under the above motion model, the updated x-coordinate $x_{t+1}$ is the prior x-coordinate $x_t$ modified by the product of the x-velocity $\dot{x}$ and the time step $\Delta t$ (e.g., if the velocity is in pixels/frame, $\Delta t=1$). Similarly, the updated y-coordinate $y_{t+1}$ is the prior y-coordinate $y_t$ modified by the product of the y-velocity $\dot{y}$ and the time step $\Delta t$. Other motion models may be used, such as uniform velocity, uniform acceleration, random motion, jerky motion, etc.

Figure 5:
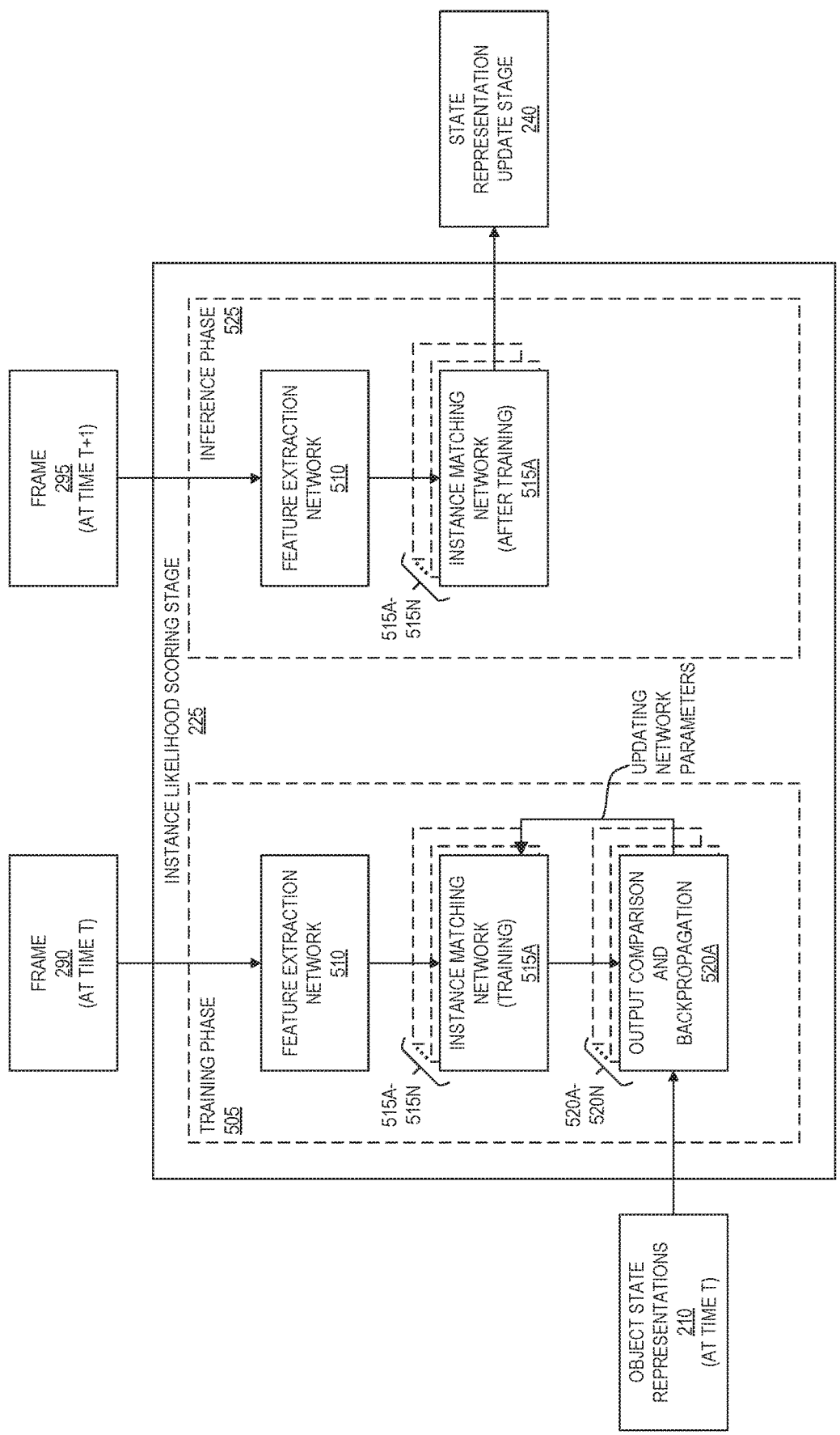
FIG. 5 is a diagram illustrating the instance likelihood scoring stage of the multiple object tracker of FIG. 2 according to some embodiments.

FIG. 5 is a diagram illustrating the instance likelihood scoring stage of the multiple object tracker of FIG. 2 according to some embodiments. Under one approach, a template-matching model is used where a portion of an image is used as a template to train a neural network and the trained neural network is used to match a portion of another image that is similar to the template. Thus, as shown, the instance likelihood scoring stage 225 includes a training phase 505, during which one or more instance matching networks 515 are trained to recognize one or more templates in one frame, and an inference phase 525, during which the one or more trained instance matching networks 515 are used to identify the location of the template(s) in a different frame. In the context of the Bayesian framework, the instance matching networks 515 are trained on a frame 290 at time t and used to evaluate the next frame 295 at time t+1.

During the training phase 505 of an iteration of a recursion, each of the instance matching networks 515A-515N are trained to recognize one of the N objects being tracked (e.g., for each object i). An instance matching network 515 may be a convolution neural network having one or more hidden layers. A feature extraction neural network 510 takes as input the frame 290 and outputs a set of features that are input to the instance matching networks 515 being trained.

One exemplary feature extraction neural network 510 is VGGNet, although other feature extraction networks may be used. The outputs of each of the instance matching networks 515 are input to an associated output comparison and backpropagation stage 520 (i.e., instance matching network 515A to output comparison and backpropagation stage 520A, instance matching network 515B to output comparison and backpropagation stage 520B, and so on).

The output comparison and backpropagation stage 520 are configured to tune the network parameters of the associated instance matching network 515 to match the region of the frame 290 that includes the associated object being tracked. In one embodiment, the desired output of the instance matching network 515 is set to be a frame-sized array with "pixel" values based on a Gaussian function with a mean centered at the centroid of the respective object. The variance of the function may be tailored so that the function has sharply fallen off before the edges of the bounding box of the associated object. In embodiments using a particle filter, the centroid of the bounding box may be calculated by taking the mean or mode of the centroids of each of the particles in the set of particles representing the object. Based on the error between the desired output and the actual output of the instance matching network 515, the output comparison and backpropagation stage 520 updates the network parameters of the instance matching network 515 to minimize the error. Once the error has reached a threshold level, the instance likelihood scoring stage 225 proceeds to the inference phase 525.

During the inference phase 525 of the iteration of a recursion, the feature extraction neural network 510 takes as input the frame 295 and outputs a set of features that are input to the trained instance matching networks 515. The output of a trained instance matching network 515 may be treated as a frame-sized heatmap where the "pixel" values correspond to how well the portions of the frame 295 matched the template used during training. In the ideal case where a Gaussian function was used to model the desired output during training, the output of the trained instance matching network 515 would be a Gaussian function centered at the location of the object in the frame 295. The outputs of the trained instance matching network 515 correspond to the instance likelihood and are provided to the state representation update stage 240 to adjust the predicted distribution representing the state of the object in the next frame from the object prediction stage 215.

Although the above-described instance likelihood scoring stage 225 employs a template-matching approach, other embodiments may use other techniques to evaluate instances of objects between the frame 290 and the frame 295, such as a Siamese network.

Note that object detection and classification networks, such as object detection and classification network 310, described above, and object detection and classification network 605, described below, often include a frontend feature extraction network. In some embodiments, the frontend feature extraction network of an object detection and classification network used elsewhere in the multiple object tracker as described herein may be used as the feature extraction network 510 in the instance likelihood scoring stage 225. For example, an object detection and classification network may be modified to provide outputs post-feature extraction (for the instance likelihood scoring stage 225) in addition to post-object detection and classification (for the initialization stage 205 or the category likelihood scoring stage 230, described below).

Although illustrated as a template-matching approach using neural networks in FIG. 5, other techniques to match an object from the current frame in the next frame may be used. For example, in some embodiments, the object is matched between frames in the Fourier domain rather than in the spatial or image domain. For example, the bounding box (whether an average of particles or based on a parametric representation of the width and height of the bounding box) of an object may be transformed into a template in the Fourier domain. The instance likelihood scoring stage 225 can evaluate the template against the Fourier-transformed next frame transformed (e.g., via multiplication) and transform the result back into the spatial domain. The result of the Fourier domain analysis can be treated like the heatmap, described above, and provided to the state representation update stage to adjust the predicted distribution representing the state of the object in the next frame from the object prediction stage 215.

Figure 6:
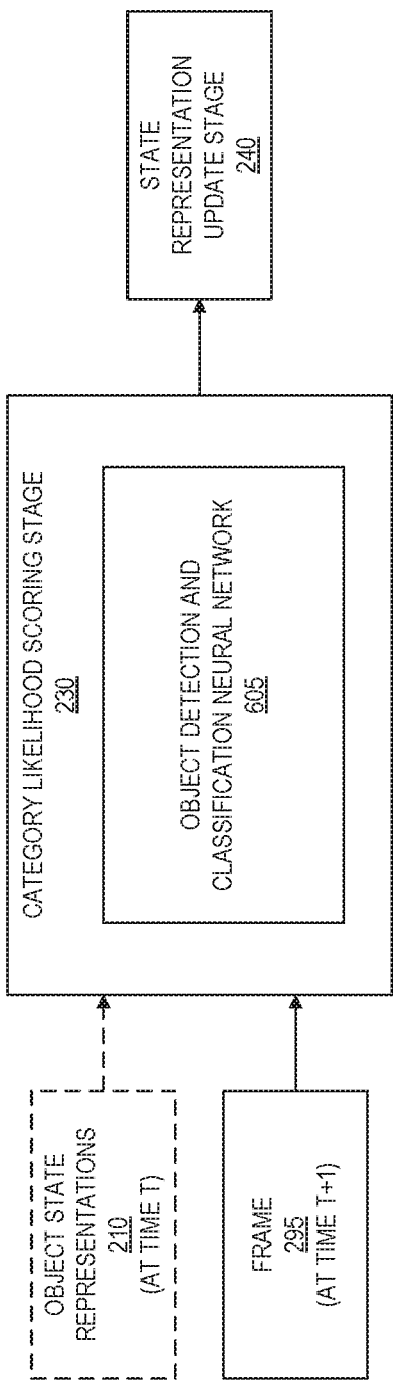
FIG. 6 is a diagram illustrating the category likelihood scoring stage of the multiple object tracker of FIG. 2 according to some embodiments.

FIG. 6 is a diagram illustrating the category likelihood scoring stage of the multiple object tracker of FIG. 2 according to some embodiments. As shown, the category likelihood scoring stage includes an object detection and classification neural network 605. The object detection and classification neural network 605 may be one of many neural networks trained to identify and classify various types of objects in a frame, such as R-CNN, Faster R-CNN, Yolo CNN, Mask R-CNN, or SSD. In some embodiments, the object detection and classification neural network 605 may be the same as the object detection and classification neural network 310. The object detection and classification neural network 605 includes an input layer that takes as input the frame 295 (at time t+1) and outputs information identifying objects, each object having an associated set of features (e.g., location, bounding box, classification vector, etc.). In some embodiments, the object detection and classification neural network 310 outputs a detection score associated with each object that indicates the confidence of the detection. The output of the object detection and classification neural network 605 is provided to the state representation update stage 240 to adjust the predicted distribution representing the state of the object in the next frame from the object prediction stage 215.

In some embodiments, the object detection and classification neural network 605 takes as input bounding boxes identifying areas of interest in the frame 295. For example, the object detection and classification neural network 605 can receive as inputs the predicted bounding box associated with each particle as determined by the motion model as a candidate region (or an average of all of the predicted bounding boxes of the particles associated with an object). The object detection and classification neural network 605 outputs a corresponding classification vector associated with each candidate region.

Figure 7:
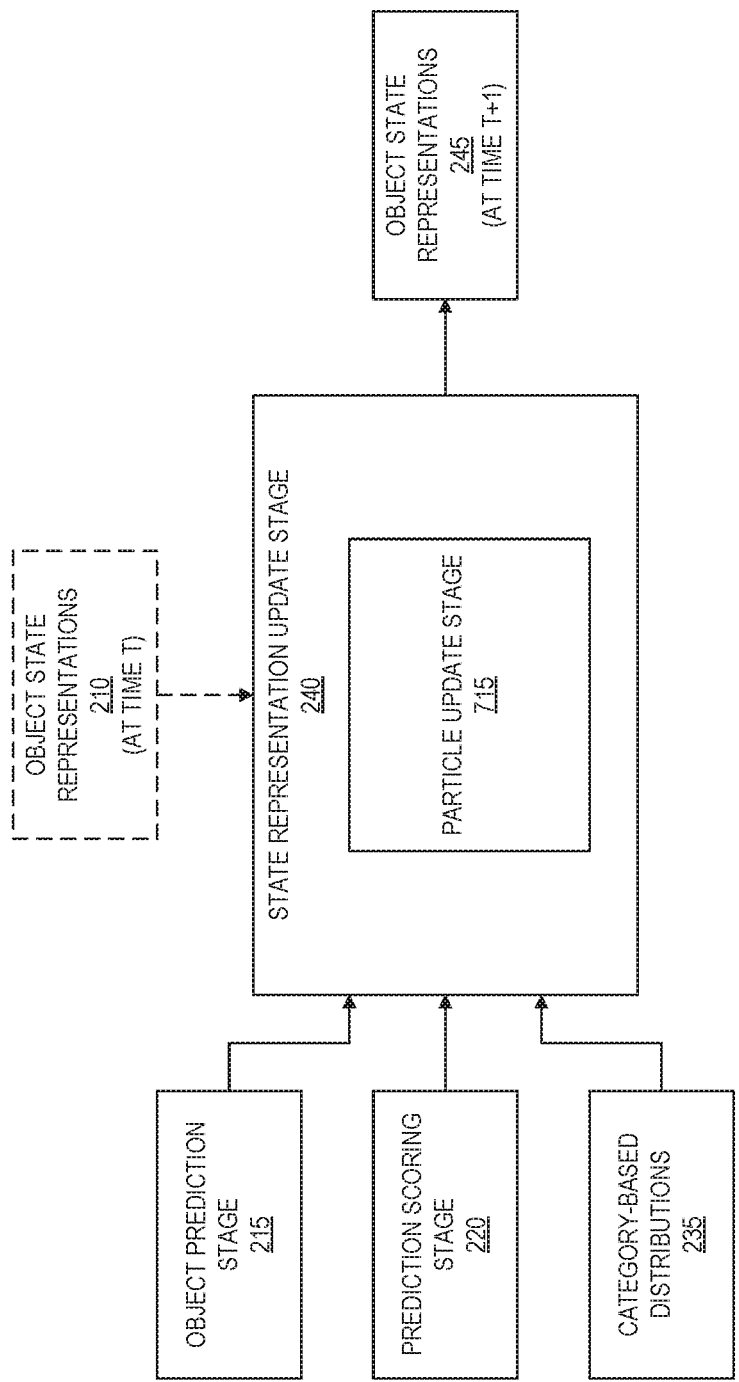
FIG. 7 is a diagram illustrating the state representation update stage of the multiple object tracker of FIG. 2 according to some embodiments.

FIG. 7 is a diagram illustrating the state representation update stage of the multiple object tracker of FIG. 2 according to some embodiments. As shown, the state representation update stage 240 includes a particle update stage 715 for embodiments employing particle filters. At a high level, the particle update stage 715 updates the set of particles associated with an object based on the outputs from the object prediction stage 215 and the prediction scoring stage 220. For example, the particle update stage 715 can update weight w of a given particle with an instance likelihood score by multiplying weight w by the particle's associated bounding box and the heat map output from the instance likelihood scoring stage 225. Thus, particles with a bounding box having a larger overlap with the region of the next frame that matches the instance of the object will be weighted higher than particles with a bounding box having a smaller overlap.

The particle update stage 715 can update the weight w of a given particle with a category likelihood score based on overlap of the particle's associated bounding box with object detection information from the object detection and classification neural network 605. For example, the particle update stage 715 may update each particle associated with a given classification based on the detected objects given the same classification. The weights may be scaled based on the overlap of a given particle's bounding box with the other detections, the confidence associated with the classification (e.g., from the classification vector), and the detection confidence assigned to the object. Thus, particles that include a high overlap with high confidence detections and classifications of the same object will be given increased weight relative to particles that do not.

The particle update stage 715 can further update the weight w of a given particle with the category-based distributions 235. For example, a category-based distribution for a person-object may be a frame-sized array of values where the "pixel" values in the skybox region of the frame include a low weight and the other values are given a higher weight (e.g., 0.2 for skybox, 1 for non-skybox). The particle update stage 715 can update the weight w of person-object particles based on their predicted bounding box overlap with the skybox. As mentioned, in some embodiments the category-based distributions 235 can be treated as uniform distributions and omitted from the weight updates.

Once the particle update stage 715 has updated the weights of each of the particles associated with a given object, the particle update stage 715 resamples the particles based on the state probability distribution of the object as modified by the updated weights. For example, the particle update stage 715 can weigh the centroid position of each particle using the particle weight to determine an updated mean centroid for the object. An updated bounding box and other features can be similarly determined. Based on these updated values, the particle update stage 715 resamples the particles around the updated probability distributions (e.g., initializes a new set of 1,000 particles for an object).

In resampling particles, the particle update stage 715 can refine the movement features associated with the particles based on the change in the position of the object between time t and time t+1. For example, if an objects centroid moved 30 pixels left and 45 pixels down between frames, that movement can be used to refine the movement features (e.g., velocity) of the object in the resampled particles. Thus, unlike the random initialization of movement features performed by the particle initialization stage 315, the particle update stage 715 can update the movement features of an object based on the movement of an object between frames.

In some embodiments, the particle update stage 715 also performs initialization functions such as when a new object enters the frame. For example, the particle update stage 715 may perform the operations of the particle initialization stage 315, as described above, when the object detection and classification neural network 605 outputs information relating to an object with a high detection confidence that has a low overlap with any of the existing objects being tracked. The detection confidence and degree of overlap may be specified by respective thresholds.

As mentioned, other embodiments may use other state estimators in place of particle filters such as Kalman filters and the like. For example, to update the state probability distribution associated with an object using Kalman filters, the state representation update stage 240 can combine a parametric distribution representing the predicted location of an object from a motion model with a parametric distribution based on the heat map output by the instance likelihood scoring stage 225 (e.g., by multiplying the two distributions). Further, to update the category associated with an object, the state representation update stage 240 can combine the existing classification vector associated with an object with the classification vector output from the category likelihood scoring stage 230 (e.g., when the category likelihood scoring stage is provided with a bounding box over the parametric distribution representing the predicted location of an object from the motion model). Other techniques for combining the likelihood score with state predictions are possible.

Figure 8:
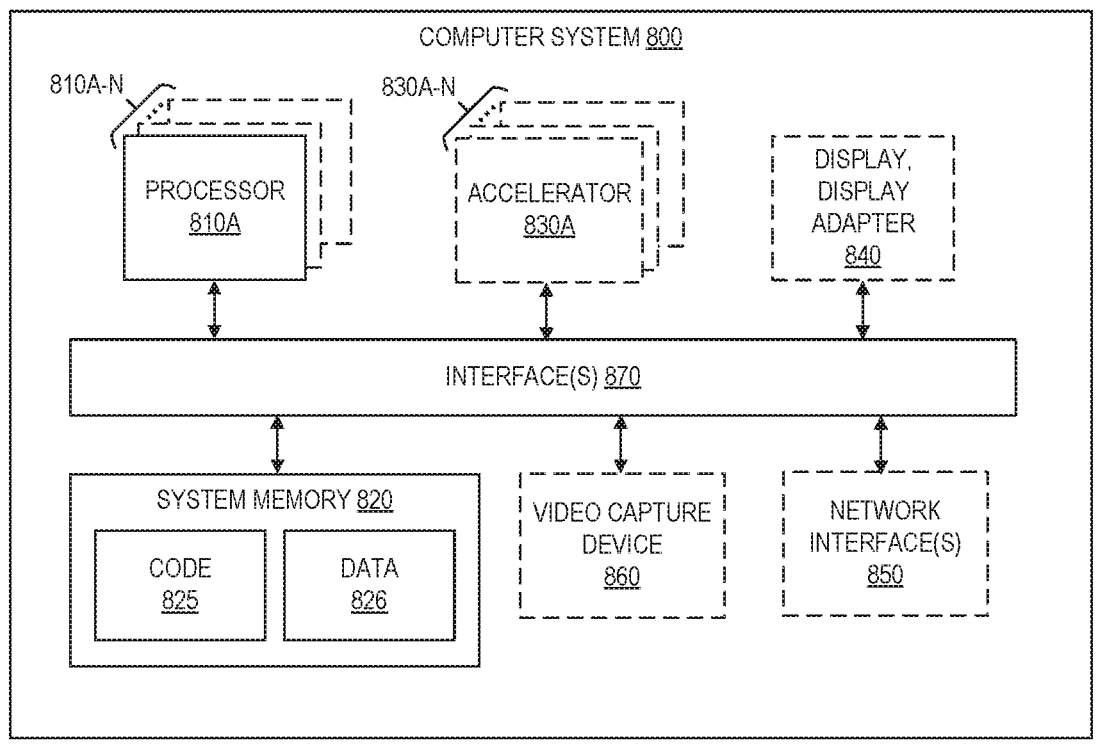
FIG. 8 is a diagram illustrating a computer system that may implement all or a portion of the multiple object tracker of FIG. 2 according to some embodiments.

FIG. 8 is a diagram illustrating a computer system that may implement all or a portion of the multiple object tracker of FIG. 2 according to some embodiments. As shown, computer system 800 includes one or more processors 810 coupled to a system memory 820 via an input/output (I/O) interface 870. Computer system 800 may optionally include one or more hardware accelerators 830, a network interface 850, a display adapter and display 840, and a video capture device 860 coupled I/O interface 870. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 810 may commonly, but not necessarily, implement the same ISA.

In some embodiments, computer system 800 includes one or more accelerators 830, such as graphics processing units (GPU) or other specialized processors, application-specific integrated circuits (ASICs), or field-programmable gate arrays (FPGAs) that can be used to improve the performance of the training and inference of neural networks as described herein.

System memory 820 may store instructions and data accessible by processor(s) 810 or accelerator(s) 830. In various embodiments, system memory 820 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 820 as code 825 and data 826.

In some embodiments, computer system 800 includes display adapter and display 840 and/or video capture device 860. Video capture device 860 may be a camera coupled to the computer system 800 that records video for analysis by the multiple object tracker as described herein. In some embodiments, video capture device 860 is coupled to the computer system 800 via a Universal Serial Bus (USB), for example. Although the disclosed multiple object tracker can be used for online video analysis, in some embodiments the video may be prerecorded and loaded to the computer system via another input, such as the network interface 850. Display adapter and display 840 allow the computer system 800 to display the video being analyzed as well as data generated by the multiple object tracker. For example, the computer system 800 can play the video while simultaneously drawing overlays on the video that correspond to data generated by the multiple object tracker, such as category labels, bounding boxes, and the like. Various display types include cathode ray tube (CRT) displays, liquid crystal displays (LCDs), light-emitting diode (LED) displays, or other displays on which to render the video and data generated by the multiple object tracker output.

In one embodiment, I/O interface 870 may be configured to coordinate I/O traffic between processor 810, system memory 820, and other peripheral devices in the computer system 800, such as network interface 850, display and display adapter 840, video capture device 860, and/or other peripheral devices. In some embodiments, I/O interface 870 may perform any necessary protocol, timing or other data transformations to convert data signals from one component (e.g., system memory 820) into a format suitable for use by another component (e.g., processor 810). In some embodiments, I/O interface 870 may include support for devices attached through various types of peripheral buses, such as a variant of the Peripheral Component Interconnect (PCI) bus standard or the Universal Serial Bus (USB) standard, for example. In some embodiments, the function of I/O interface 870 may be split into two or more separate components, such as a north bridge and a south bridge, for example. Also, in some embodiments some or all of the functionality of I/O interface 870, such as an interface to system memory 820, may be incorporated directly into processor 810.

Network interface 850 may be configured to allow data to be exchanged between computer system 800 and other devices attached to a network such as a public network (e.g., the internal or a private network. In various embodiments, network interface 850 may support communication via any suitable wired or wireless general data networks, such as types of Ethernet network, for example. Additionally, network interface 850 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 820 may be one embodiment of a computer-accessible medium configured to store program instructions and data as described above. However, in other embodiments, program instructions and/ or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 870. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 850.

Figure 9:
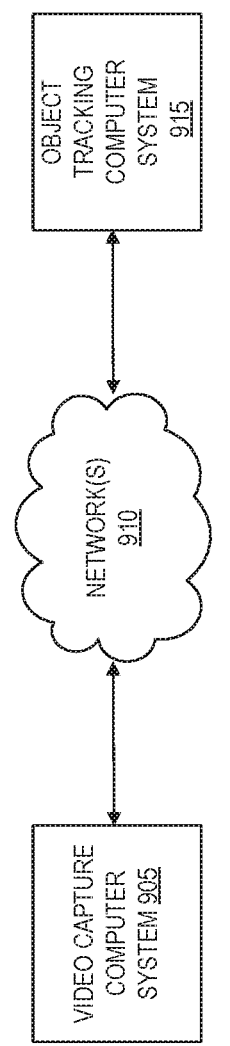
FIG. 9 is a diagram illustrating networked computer systems that may implement the multiple object tracker of FIG. 2 according to some embodiments.

FIG. 9 is a diagram illustrating networked computer systems that may implement all or a portion of the multiple object tracker of FIG. 2 according to some embodiments. As shown, a video capture computer system 905 is in communication with an object tracking computer system 915 via one or more networks 910, such as the internet. Computer systems 905 and 915 may be implemented as embodiments of computer system 800 as described above with reference to FIG. 8. Video capture computer system 905 captures video for analysis and sends (or streams) the video to the object tracking computer system 915. Object tracking computer system 915 may be a server or workstation that provides a tracking service through which remote computer systems, such as video capture computer system 905, can send video for analysis using the object tracking techniques as described herein. If the video capture computer system 905 includes a display, the object tracking computer system 915 can send object state information keyed to particular frames back to the video capture computer system 905 so that the video capture computer system 905 can render the state information while playing the video, subject to some delay associated with the round-trip-time between video submission and receipt of the analysis. Such display may include displaying bounding boxes and category labels over the regions in the video frame corresponding to objects being tracked by the object tracking computer system 915. In some embodiments, the object tracking computer system 915 can send object state information along with the video to another computer system (not shown) for display, as described above.

Figure 10:
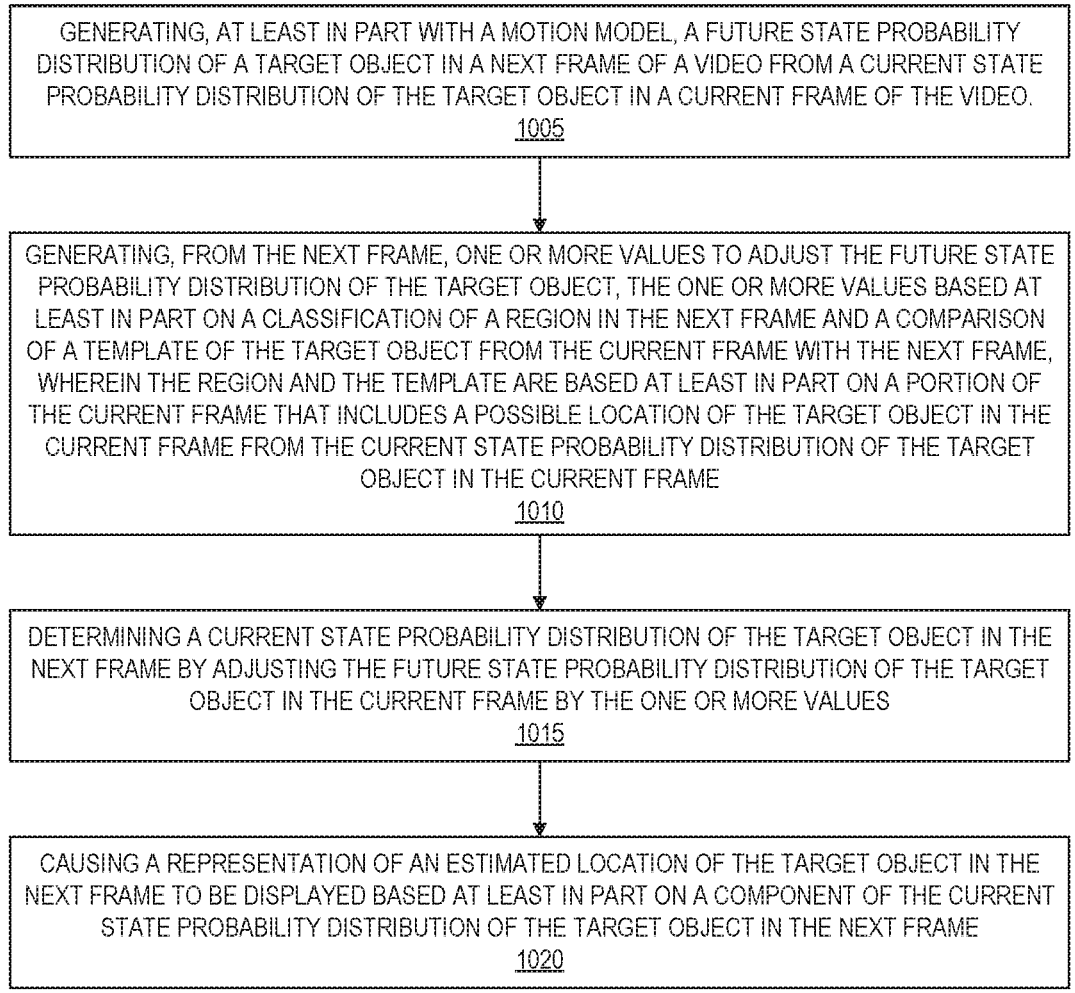
FIG. 10 is a flow diagram illustrating operations of a method for multiple object tracking by combining neural networks within a Bayesian framework according to some embodiments.

FIG. 10 is a flow diagram illustrating operations of a method for multiple object tracking by combining neural networks within a Bayesian framework according to some embodiments. Some or all of the operations of FIG. 10 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations of FIG. 10 are performed by the components of the other figures (e.g., the initialization stage 205, the object prediction stage 215, the prediction scoring stage 220, and the state representation update stage 240).

The operations include, at block 1005, generating, at least in part with a motion model, a future state probability distribution of a target object in a next frame of a video from a current state probability distribution of the target object in a current frame of the video. As described above, a probability distribution is used to represent possible states of an object (e.g., hypotheses) rather than a single discrete value. A discrete state of an object may include various features, such as the center object, a bounding box of the object, a classification of the object, etc. Exemplary probability-based state estimates may be represented using particles or with parametric distributions. As described above with reference to FIGS. 2 and 4, the object prediction stage 215 generates a predicted or future state probability distribution from an object's current state probability distribution as estimated from a current frame. For example, a motion model may be applied to an estimated current position of an object to determine its estimated position in the next frame.

The operations include, at block 1010, generating, from the next frame, one or more values to adjust the future state probability distribution of the target object, the one or more values based at least in part on a classification of a region in the next frame and a comparison of a template of the target object from the current frame with the next frame, wherein the region and the template are based at least in part on a portion of the current frame that includes a possible location of the target object in the current frame from the current state probability distribution of the target object in the current frame. As described above with reference to FIGS. 2, 5, and 6, the prediction scoring stage 220 can be used to generate values relating to both the instance likelihood and the category likelihood. These values can be used to scale or adjust the probability distribution of the state of the object that was generated based on the current frame. For example, a template based on an estimated location of the object in the current frame can be used to generate a plurality of values representing a "heatmap" of the region in the next frame matching the template. The probability distribution represented by such a heatmap can be used to adjust an object's predicted state probability distribution. As another example, object detections (including bounding boxes) and classifications of a region of a frame can be used to adjust an object's predicted state probability distribution.

The operations include, at block 1015, determining a current state probability distribution of the target object in the next frame by adjusting the future state probability distribution of the target object in the current frame by the one or more values. As described above with reference to FIG. 7, an object's predicted state of an object is adjusted by a function or model derived from the next frame. The function or model may be based on scores from the prediction scoring stage 220, for example, such as a category likelihood score and an instance likelihood score. The state representation update stage 240 applies the function or model to an object's estimated or future state probability distribution. For example, in embodiments using a particle filter, the weights of each particle may be updated as described herein to reshape the probability distribution.

The operations include, at block 1020, causing a representation of an estimated location of the target object in the next frame to be displayed based at least in part on a component of the current state probability distribution of the target object in the next frame. As described herein, an object may have an associated set of features such as a location (e.g., a centroid and bounding box), motion features (e.g., velocity, acceleration), and classification features (e.g., a label identifying the object as a person, animal, vehicle, etc.). Representations of one or more of these features may be overlaid on top of the video as it is rendered to a display.

Embodiments of the multiple object tracker described herein provide several advantages. By using a Bayesian framework, the multiple object tracker is able to be used in online object tracker as well as for prerecorded video. Further, by combining the outputs of neural networks within the Bayesian framework, the specific neural networks used for functions such as feature extraction, object detection, object classification, etc. can be treated as modular components of the tracker such that advances in those areas can be easily incorporated into the framework. Further, the framework can be used to combine neural networks that work with a wide variety of data sets (e.g., object detection of people, animals, vehicles, etc.). Additionally, by tracking object states with probability distributions, the disclosed multiple object feature tracker is robust to many challenging aspects of video tracking, such as object occlusion, temporary misidentification, and noise or errors in the video input and processing components.

Various embodiments discussed or suggested herein can be implemented in a wide variety of operating environments, which in some cases can include one or more user computers, computing devices, or processing devices which can be used to operate any of a number of applications such as the multiple object tracker described herein. Exemplary computing devices include desktop or laptop computers, smart phones, and the like running an operating system. Other computing devices include workstations running any of a variety of commercially-available operating systems and other known applications for purposes such as development and database management. These devices also can include other electronic devices, such as dummy terminals, thin-clients, gaming systems, and/or other devices capable of communicating via a network.

Embodiments that use a network for supporting communications may use any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 515A-515N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
generating, based at least in part on a current state probability distribution of a target object of a plurality of target objects in a current frame of a video, a future state probability distribution of the target object in a next frame of the video, wherein a future state in the future state probability distribution includes a possible location of the target object in the next frame and a current state in the current state probability distribution includes a possible location of the target object in the current frame, and wherein the possible location of the target object in the next frame is generated with a motion model applied to the possible location of the target object in the current frame;
generating, from the next frame, a state likelihood model of the target object in the next frame from a classification of a region in the next frame and a comparison of a template of the target object from the current frame with the next frame, wherein the region and the template are based at least in part on a portion of the current frame that includes the possible location of the target object in the current frame;
determining a current state probability distribution of the target object in the next frame by applying the state likelihood model to the future state probability distribution of the target object in the current frame; and
causing a representation of an estimated location of the target object in the next frame to be displayed based at least in part on a component of the current state probability distribution of the target object in the next frame.

2. The computer-implemented method of claim 1, wherein the classification of the region in the next frame is determined by a first convolutional neural network and the comparison of the template of the target object with the next frame is determined by a second convolutional neural network.

3. The computer-implemented method of claim 1, wherein the state likelihood model scales a state sampled from the future state probability distribution of the target object in the next frame of the video.

4. A computer-implemented method comprising:
generating, at least in part with a motion model, a future state probability distribution of a target object in a next frame of a video from a current state probability distribution of the target object in a current frame of the video;
generating, from the next frame, one or more values to adjust the future state probability distribution of the target object, the one or more values based at least in part on a classification of a region in the next frame and a comparison of a template of the target object from the current frame with the next frame, wherein the region and the template are based at least in part on a portion of the current frame that includes a possible location of the target object in the current frame from the current state probability distribution of the target object in the current frame;
determining a current state probability distribution of the target object in the next frame by adjusting the future state probability distribution of the target object in the current frame by the one or more values; and
causing a representation of an estimated location of the target object in the next frame to be displayed based at least in part on a component of the current state probability distribution of the target object in the next frame.

5. The computer-implemented method of claim 4, wherein the current state probability distribution is represented by a mean and a variance.

6. The computer-implemented method of claim 4, wherein the one or more values are not based on any frames subsequent to the next frame in the video.

7. The computer-implemented method of claim 4, wherein the representation of the estimated location of the target object in the next frame is a bounding box overlaid on the next frame.

8. The computer-implemented method of claim 4, wherein the current state probability distribution is represented by a plurality of particles, each particle in the plurality of particles representing a possible state of the target object, wherein a state of the target object includes a location of the target object and a classification of the target object.

9. The computer-implemented method of claim 8, wherein each particle includes a weight, and wherein the one or more values scale the weight of the particle.

10. The computer-implemented method of claim 4, wherein the classification of the region in the next frame is determined by a first convolutional neural network and the comparison of the template of the target object with the next frame is determined by a second convolutional neural network.

11. The computer-implemented method of claim 10, wherein the first convolutional neural network includes a feature extraction network, and wherein an output of the feature extraction network is an input to the second convolutional neural network.

12. The computer-implemented method of claim 10, wherein the second convolutional neural network is trained to match a region of the current frame bounded by a bounding box of the target object.

13. A system comprising:
a storage device to store a current frame of a video and a next frame of the video; and
a multiple object tracking service implemented by one or more electronic devices, the multiple object tracking service including instructions that upon execution cause the multiple object tracking service to:
  obtain the current frame and the next frame from the storage device;
  generate, at least in part with a motion model, a future state probability distribution of a target object in the next frame from a current state probability distribution of the target object in the current frame;
  generate, from the next frame, one or more values to adjust the future state probability distribution of the target object, the one or more values based at least in part on a classification of a region in the next frame and a comparison of a template of the target object from the current frame with the next frame, wherein the region and the template are based at least in part on a portion of the current frame that includes a possible location of the target object in the current frame from the current state probability distribution of the target object in the current frame;
  determine a current state probability distribution of the target object in the next frame by adjusting the future state probability distribution of the target object in the current frame by the one or more values; and
  cause a representation of an estimated location of the target object in the next frame to be displayed based at least in part on a component of the current state probability distribution of the target object in the next frame.

14. The system of claim 13, wherein the current state probability distribution is represented by a mean and a variance.

15. The system of claim 13, wherein the one or more values are not based on any frames subsequent to the next frame in the video.

16. The system of claim 13, wherein the current state probability distribution is represented by a plurality of particles, each particle in the plurality of particles representing a possible state of the target object, wherein a state of the target object includes a location of the target object and a classification of the target object.

17. The system of claim 16, wherein each particle includes a weight, and wherein the one or more values scale the weight of the particle.

18. The system of claim 13, wherein the classification of the region in the next frame is determined by a first convolutional neural network and the comparison of the template of the target object with the next frame is determined by a second convolutional neural network.

19. The system of claim 18, wherein the first convolutional neural network includes a feature extraction network, and wherein an output of the feature extraction network is an input to the second convolutional neural network.

20. The system of claim 18, wherein the second convolutional neural network is trained to match a region of the current frame bounded by a bounding box of the target object.

* * * * *